Figure 1:
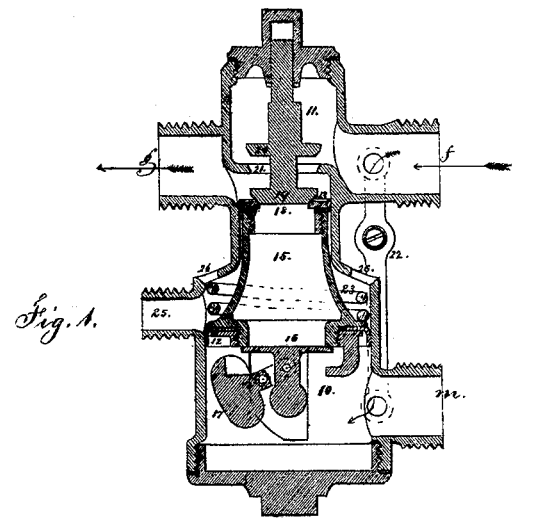

H. H. CRAIGIE.

Improvement in Valves for Water-Raising Apparatus.

No. 126,269.

Patented April 30, 1872.

125,269

UNITED STATES PATENT OFFICE.

HUGH H. CRAIGIE, OF NEW YORK, N. Y.

IMPROVEMENT IN VALVES FOR WATER-RAISING APPARATUS.

Specification forming part of Letters Patent No. 126,269, dated April 30, 1872.

*To all whom it may concern:*

Be it known that I, HUGH H. CRAIGIE, of the city and State of New York, have invented and made an Improvement in Valves for Water-Raising Apparatus, and the following is declared to be a correct description of the same.

This invention is applicable to water-raising apparatus, in which the pressure of a given head of water in one vessel is made to raise a smaller quantity of water to a greater height through the agency of a smaller vessel, the larger vessel being made to operate when water is drawn out of the same for use under the lower head, such as in kitchens; and when the drawing of the water ceases the pressure acting to refill the vessel from which it has been drawn forces the water from a smaller vessel to a greater altitude.

Reference is hereby made to an application for a patent on an apparatus of the foregoing description, dated November 10, 1869, and allowed to me December 29, 1869.

Figure 2:
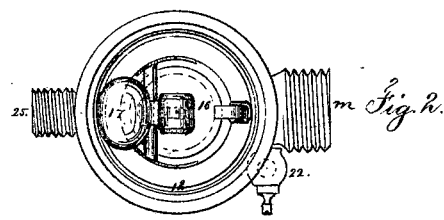

In the drawing, Figure 1 is a vertical section, and Fig. 2 is an inverted plan of this cock with the base removed.

The supply-pipe connects to the coupling $f$. The coupling $g$ is connected to the larger vessel $a$ (of aforesaid application.) The coupling $m$ connects to the draw-cocks in the kitchen or lower part of the building to be supplied; and a pipe from $m$ passes to the smaller vessel going through a check-valve, as in aforesaid application. The cock is made of two cylinders, 10 and 11, of different areas, within which are the cup-leather pistons 12 and 13, upon a hollow piston, 15, having a valve, 16, balanced by a weight, 17, at the lower end, and a seat, 18, for a valve, 19, at the upper end; and the valve 19 is on a stem that has a second valve, 20, taking a seat, 21, between $f$ and $g$. Between the inlet $f$ and cylinder 10 is a tube and cock, 22, that allows a small amount of water to leak into 10, and when the pressure is equalized the spring 23 will be compressed by the superior area of the cylinder 10 and the parts assume the position shown, the water being free to go through the seat 21 into the larger vessel $a$ to act to eject water to a greater height from the smaller vessel.

If either of the cocks are opened connected with $m$, the pressure in 10 is lessened; the piston 15 instantly descends sufficient to close the seat 21 and draw away from the valve 19, opening the seat 18, and the water flows through the hollow piston 15 from the larger vessel $a$, the balanced valve 16 offering but little resistance. The instant the drawing of water ceases, the balanced valve 16 closes, the pressure in 10 accumulates by the leakage through 22, the piston rises, and the parts assume their normal position.

The pipe 25 can be used to convey away any leakage, and the openings at 26 are important for the admission of air.

I claim as my invention—

The arrangement of the valves 19 20 16 and their respective seats, in combination with the piston 15 and water-ways, substantially as set forth.

Dated August 29, A. D. 1870.

H. H. CRAIGIE.

Witnesses:
 CHAS. H. SMITH,
 GEO. T. PINCKNEY.